(12) United States Patent
Nicholas et al.

(10) Patent No.: US 10,217,290 B2
(45) Date of Patent: *Feb. 26, 2019

(54) REGISTRATION BETWEEN ACTUAL MOBILE DEVICE POSITION AND ENVIRONMENTAL MODEL

(71) Applicant: Apple Inc., Cupertino, CA (US)

(72) Inventors: Christopher G. Nicholas, Alameda, CA (US); Lukas M. Marti, San Jose, CA (US); Rudolph van der Merwe, Portland, OR (US); John Kassebaum, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/936,286

(22) Filed: Mar. 26, 2018

(65) Prior Publication Data

US 2018/0218542 A1    Aug. 2, 2018

Related U.S. Application Data

(62) Division of application No. 13/782,921, filed on Mar. 1, 2013, now Pat. No. 9,928,652.

(51) Int. Cl.
*G06T 19/00* (2011.01)
*G06F 3/01* (2006.01)

(52) U.S. Cl.
CPC ............ *G06T 19/006* (2013.01); *G06F 3/011* (2013.01)

(58) Field of Classification Search
None
See application file for complete search history.

(56) References Cited

U.S. PATENT DOCUMENTS

| | | |
|---|---|---|
| 6,333,749 B1 | 12/2001 | Reinhardt et al. |
| 6,535,210 B1 | 3/2003 | Ellenby et al. |
| 6,604,049 B2 | 8/2003 | Yokota |
| 8,036,678 B2 | 10/2011 | Goldenberg et al. |
| 8,150,617 B2 | 4/2012 | Manber et al. |

(Continued)

FOREIGN PATENT DOCUMENTS

| | | |
|---|---|---|
| EP | 2071510 | 6/2009 |
| EP | 2493187 | 8/2012 |

(Continued)

OTHER PUBLICATIONS

U.S. Appl. No. 13/782,921, "Advisory Action", dated Oct. 31, 2016, 5 pages.

(Continued)

*Primary Examiner* — Michael J Cobb
(74) *Attorney, Agent, or Firm* — Kilpatrick Townsend & Stockton LLP

(57) ABSTRACT

A user interface enables a user to calibrate the position of a three dimensional model with a real-world environment represented by that model. Using a device's sensor, the device's location and orientation is determined. A video image of the device's environment is displayed on the device's display. The device overlays a representation of an object from a virtual reality model on the video image. The position of the overlaid representation is determined based on the device's location and orientation. In response to user input, the device adjusts a position of the overlaid representation relative to the video image.

20 Claims, 3 Drawing Sheets

(56) References Cited

U.S. PATENT DOCUMENTS

| | | | |
|---|---|---|---|
| 8,180,396 B2 | 5/2012 | Athsani et al. | |
| 8,943,582 B1 | 1/2015 | Zhou et al. | |
| 9,679,414 B2* | 6/2017 | Nicholas | G06T 19/006 |
| 9,928,652 B2* | 3/2018 | Nicholas | G06T 19/006 |
| 2002/0140745 A1 | 10/2002 | Ellenby et al. | |
| 2002/0163521 A1 | 11/2002 | Ellenby et al. | |
| 2003/0128162 A1 | 7/2003 | Ellenby et al. | |
| 2004/0212630 A1 | 10/2004 | Hobgood et al. | |
| 2005/0021836 A1 | 1/2005 | Reed et al. | |
| 2005/0024501 A1 | 2/2005 | Ellenby et al. | |
| 2006/0190812 A1 | 8/2006 | Ellenby et al. | |
| 2006/0197837 A1 | 9/2006 | Flath et al. | |
| 2007/0098238 A1 | 5/2007 | Obrador | |
| 2008/0062167 A1 | 3/2008 | Boggs et al. | |
| 2008/0071559 A1 | 3/2008 | Arrasvuori | |
| 2008/0215509 A1 | 9/2008 | Charlton | |
| 2008/0297436 A1 | 12/2008 | Oikawa et al. | |
| 2009/0128564 A1 | 5/2009 | Okuno | |
| 2010/0009700 A1 | 1/2010 | Camp, Jr. et al. | |
| 2010/0100835 A1 | 4/2010 | Klaric et al. | |
| 2010/0127971 A1 | 5/2010 | Ellenby et al. | |
| 2010/0185529 A1 | 7/2010 | Chesnut et al. | |
| 2010/0191459 A1 | 7/2010 | Carter et al. | |
| 2010/0214284 A1 | 8/2010 | Rieffel et al. | |
| 2010/0239121 A1 | 9/2010 | Meier et al. | |
| 2010/0257252 A1 | 10/2010 | Dougherty et al. | |
| 2010/0277611 A1 | 11/2010 | Holt et al. | |
| 2010/0325154 A1 | 12/2010 | Schloter et al. | |
| 2010/0325563 A1 | 12/2010 | Goldthwaite et al. | |
| 2011/0006977 A1 | 1/2011 | Khosravy et al. | |
| 2011/0087662 A1 | 4/2011 | Darby, Jr. et al. | |
| 2011/0115671 A1 | 5/2011 | Sweet, III et al. | |
| 2011/0135207 A1 | 6/2011 | Flynn et al. | |
| 2011/0246490 A1 | 10/2011 | Jonsson | |
| 2011/0310227 A1 | 12/2011 | Konertz et al. | |
| 2011/0316845 A1 | 12/2011 | Roberts et al. | |
| 2012/0086727 A1* | 4/2012 | Korah | G06F 3/03 345/633 |
| 2012/0105202 A1 | 5/2012 | Gits et al. | |
| 2012/0120103 A1 | 5/2012 | Border et al. | |
| 2012/0120113 A1 | 5/2012 | Hueso | |
| 2012/0127284 A1 | 5/2012 | Bar-Zeev et al. | |
| 2012/0201472 A1* | 8/2012 | Blanchflower | G06K 9/00671 382/224 |
| 2012/0218263 A1 | 8/2012 | Meier et al. | |
| 2012/0218296 A1 | 8/2012 | Belimpasakis et al. | |
| 2012/0242698 A1 | 9/2012 | Haddick et al. | |
| 2012/0249429 A1 | 10/2012 | Anderson et al. | |
| 2012/0249443 A1 | 10/2012 | Anderson et al. | |
| 2012/0329474 A1 | 12/2012 | Seavey et al. | |
| 2012/0329486 A1 | 12/2012 | Gits et al. | |
| 2013/0036364 A1 | 2/2013 | Johnson | |
| 2013/0050260 A1 | 2/2013 | Reitan | |
| 2013/0107038 A1 | 5/2013 | Ota et al. | |
| 2013/0155106 A1 | 6/2013 | Rolleston et al. | |
| 2013/0191246 A1 | 7/2013 | Calman et al. | |
| 2013/0222369 A1 | 8/2013 | Huston et al. | |
| 2013/0257848 A1 | 10/2013 | Westerinen et al. | |
| 2013/0321390 A1 | 12/2013 | Latta et al. | |
| 2013/0335405 A1 | 12/2013 | Scavezze et al. | |
| 2014/0002496 A1 | 1/2014 | Lamb et al. | |
| 2014/0073345 A1 | 3/2014 | Chintalapudi et al. | |
| 2014/0247279 A1 | 9/2014 | Nicholas et al. | |
| 2014/0247280 A1 | 9/2014 | Nicholas et al. | |
| 2014/0363143 A1 | 12/2014 | Dharssi et al. | |
| 2015/0011249 A1 | 1/2015 | Siliski et al. | |
| 2015/0169987 A1 | 6/2015 | Nalawadi et al. | |
| 2015/0279213 A1 | 10/2015 | Balter et al. | |
| 2016/0291922 A1* | 10/2016 | Montgomerie | G06T 19/006 |

FOREIGN PATENT DOCUMENTS

| | | |
|---|---|---|
| WO | 9942946 | 8/1999 |
| WO | 0171282 | 9/2001 |
| WO | 02073818 | 9/2002 |
| WO | 2008143523 | 11/2008 |
| WO | 2011045276 | 4/2011 |
| WO | 2011145482 | 11/2011 |
| WO | 2012049674 | 4/2012 |
| WO | 2014133709 | 9/2014 |
| WO | 2014133710 | 9/2014 |

OTHER PUBLICATIONS

U.S. Appl. No. 13/782,921 , "Final Office Action", dated Nov. 19, 2015, 29 pages.

U.S. Appl. No. 13/782,921 , "Final Office Action", dated Jul. 28, 2016, 43 pages.

U.S. Appl. No. 13/782,921 , "Final Office Action", dated Jul. 26, 2017, 58 pages.

U.S. Appl. No. 13/782,921 , "Non-Final Office Action", dated Jun. 23, 2015, 19 pages.

U.S. Appl. No. 13/782,921 , "Non-Final Office Action", dated Feb. 18, 2016, 41 pages.

U.S. Appl. No. 13/782,921 , "Non-Final Office Action", dated Jan. 12, 2017, 45 pages.

U.S. Appl. No. 13/782,921 , "Notice of Allowance", dated Nov. 24, 2017, 24 pages.

U.S. Appl. No. 13/782,921 , "Restriction Requirement", dated Apr. 10, 2015, 7 pages.

U.S. Appl. No. 13/783,082 , "Final Office Action", dated May 26, 2015, 21 pages.

U.S. Appl. No. 13/783,082 , "Final Office Action", dated Apr. 21, 2016, 27 pages.

U.S. Appl. No. 13/783,082 , "Non-Final Office Action", dated Dec. 4, 2014, 14 pages.

U.S. Appl. No. 13/783,082 , "Non-Final Office Action", dated Nov. 5, 2015, 25 pages.

U.S. Appl. No. 13/783,082 , "Non-Final Office Action", dated Oct. 5, 2016, 34 pages.

U.S. Appl. No. 13/783,082 , "Notice of Allowance", dated Feb. 14, 2017, 15 pages.

Ababsa et al., "Robust Camera Pose Estimation Using 2D Fiducials Tracking for Real-Time Augmented Reality Systems", Proceedings of the 2004 ACM SIGGRAPH international conference on Virtual Reality continuum and its applications in industry VRCAI '04., Feb. 18, 2016, pp. 431-435.

Alandry et al., "A MEMS-based multi-sensor system for attitude determination", Symposium on Design, Test, Integration & Packaging of MEMS/MOEMS, Apr. 2009, pp. 261-264.

Bischoff et al., "Kuka: Concepts,Tools and Devices for Facilitating Human-Robot Interaction with Industrial Robots through Augmented Reality", ISMAR Workshop on Industrial Augmented Reality, Santa Barbara, CA, 2006, pp. 1-35.

Caarls , "Pose estimation for mobile devices and augmented reality", Dissertations, No. 1145, Sep. 25, 2009, 219 pages.

Elmqvist et al., "Employing Dynamic Transparency for 3D Occlusion Management: Design Issues and Evaluation", Human-Computer Interaction—Interact 2007, LNCS 4662:, 2007, pp. 532-545.

Gao et al., "Easy Calibration of a Head-Mounted Projective Display for Augmented Reality Systems", Proceedings of the Virtual Reality 2003 Conference, 2003, pp. 53-60.

Henrysson , "Bringing Augmented Reality to Mobile Phones", Linkoping Studies in Science and Technology, 2007, 80 pages.

Herve et al., "Dynamic Registration for Augmented Reality in Telerobotics Applications", IEEE International Conference on Systems, Man, and Cybernetics, Nashville, 2000, pp. 1348-1353.

Kalkofen et al., "Chapter 3: Visualization Techniques for Augmented Reality", Handbook of Augmented Reality, ISBN: 978-1-4614-0064-6, 2011, pp. 65-98.

Kalkofen et al., "Comprehensible Visualization for Augmented Reality", IEEE Transactions on Visualization and Computer Graphics, vol. 15, issue 2, 2009, pp. 193-204.

(56) References Cited

OTHER PUBLICATIONS

Kalkofen et al., "Interactive Focus and Context Visualization for Augmented Reality", Proceedings of the 2007 6th IEEE and ACM International Symposium on Mixed and Augmented Reality, 2007, pp. 1-10.

Kato et al., "Marker tracking and HMO calibration for a video-based augmented reality conferencing system", Augmented Reality. 1999. (IWAR '99). Proceedings. 2nd IEEE and ACM International Workshop in San Francisco. CA, Los Alamitos, CA. USA. IEEE Comput. Soc. US., Oct. 20, 1999, pp. 85-94.

Mendez et al., "Generating Semantic 3D Models of Underground Infrastructure", IEEE Computer Graphics and Applications, vol. 28, issue 3, 2008, pp. 48-57.

Neumann et al., "GeoPointing on indoor maps: enhancing compass sensor accuracy to enable interactive digital object selection in smartphone-based map applications", Proceedings of the 10th ACM international symposium on Mobility management and wireless access, Oct. 2012, pp. 63-70.

Pan et al., "Tracking Mobile Users in Wireless Networks via Semi-Supervised Colocalization", IEEE Transactions on Pattern Analysis and Machine Intelligence, vol. 34, No. 3, 2012, pp. 587-600.

International Patent Application No. PCT/US2014/013946 , "International Preliminary Report on Patentability", dated Sep. 21, 2015, 9 pages.

International Patent Application No. PCT/US2014/013946 , "International Search Report & Written Opinion", dated Apr. 2, 2014, 13 pages.

International Patent Application No. PCT/US2014/013949 , "International Preliminary Report on Patentability", dated Sep. 11, 2015, 9 pages.

International Patent Application No. PCT/US2014/013949 , "International Search Report and Written Opinion", dated Apr. 2, 2014, 11 pages.

Siltanen , "Theory and Applications of Marker-based Augmented Reality", Espoo 2012, VTT Science 3, VTT Technical Research Centre of Finland, VTT, Finland, 2012.

State et al., "Superior Augmented Reality Registration by Integrating Landmark Tracking and Magnetic Tracking", Proceedings of the 23rd annual conference on Computer graphics and interactive techniques SIGGRAPH '96, 1996, pp. 429-438.

Wells , "Generating Enhanced Natural Environments and Terrain for Interactive Combat Simulations (Genetics)", Naval Postgraduate School, 2005, 169 pages.

You et al., "Fusion of Vision and Gyro Tracking for Robust Augmented Reality Registration", Proceedings IEEE Virtual Reality, Jan. 2001, pp. 71-78.

Zollmann et al., "Comprehensible and Interactive Visualizations of GIS Data in Augmented Reality", Advances in Visual Computing, Lecture Notes in Computer Science (LNCS) 7431, 2012, pp. 675-685.

Reitmayr et al, "Initialisation for Visual Tracking in Urban Environments", 2007, 6th IEEE and ACM International Symposium on Mixed and Augmented Reality, pp. 1-9, DOI: 10.1109/ISMAR.2007.4538842.

Irschara et al., "From Structure-from-Motion Point Clouds to Fast Location Recognition", 2009, IEEE Conference on Computer Vision and Pattern Recognition, pp. 2599-2606, DOI:10.1109/CVPR.2009.5206587.

Li et al., "Location Recognition Using Prioritized Feature Matching", 2010, European Conference on Computer Vision (ECCV) 2010, Part 11, Lecture Notes in Computer Science (LNCS) 6312, pp. 791-804.

Gordon et al., "What and Where: 3D Object Recognition with Accurate Pose", 2006, Toward Category-Level Object Recognition, Lecture Notes in Computer Science, vol. 4170, pp. 67-82.

Rothganger et al., "3D Object Modeling and Recognition Using Affine-Invariant Patches and Multi-View Spatial Constraints", 2003, Proceedings of the 2003 IEEE Computer Society Conference on Computer Vision and Pattern Recognition (CVPR'03), pp. 1-6, DOI: 10.1109/CVPR.2003.1211480.

\* cited by examiner

REGISTRATION BETWEEN ACTUAL MOBILE DEVICE POSITION AND ENVIRONMENTAL MODEL

CROSS REFERENCES TO RELATED APPLICATIONS

This application is a divisional of U.S. patent application Ser. No. 13/782,921, filed on Mar. 1, 2013, in the United States Patent and Trademark Office, now allowed, the disclosure of which is hereby incorporated by reference herein in its entirety.

BACKGROUND

The present disclosure relates generally to user interfaces, and in particular to a user interface that enables a user to calibrate the position of a three dimensional model with a real-world environment represented by that model.

Some applications are being developed for mobile devices which allow users to view an "augmented reality" or "enhanced reality" view of their real, physical environment. Some mobile devices, including cell phones and so-called smart phones, come equipped with cameras and graphical display screens. A camera may be mounted on the side of the device that is opposite of the side on which the device's display is placed. Enhanced reality applications typically capture the contents currently within the view of the camera in real time and present those contents on the display. Thus, the mobile device's user can hold up the mobile device in front of his field of vision in order to use the device's graphical display as a sort of camera view finder. The device's display shows the user everything that the camera can see. However, enhanced reality applications go further than simply presenting a view of the real world to the device's user. Enhanced reality applications seek to register a projected model of the world with live video of the world. Enhanced reality applications are frequently capable of overlaying real-world view with information about the people and objects contained within that view. For example, an enhanced reality application might overlay a particular building within a view with the name of the corporation whose office the building houses. For another example an enhanced reality application might overlay a particular street within a view with its name. For yet another example, more sophisticated applications might even seek to present the names of people within a view within virtual text bubbles floating above those people's faces.

In order to overlay information over a particular object within the real world view in an accurate manner, the enhanced reality application must have some way of determining which of the many pixels within the view correspond to that particular object. The real world view might contain various pixels corresponding to many different objects in various different locations. If the overlaid information is placed within the wrong spot within the view, then the user of the enhanced reality application may become confused or misinformed. Therefore, enhanced reality applications may refer to a virtual model of the real world. This virtual model might include, for each known real-world object, a set of three dimensional coordinates that represent points defining the contours of the surface of that object. For example, the set of coordinates for a building would probably include at least coordinates for the points at the corners of the building. If the coordinates corresponding to a particular object are connected with lines, a wire-frame model of that particular object may be produced.

Possessing a particular object's set of coordinates, or its wire-frame model, helps very little unless those coordinates are accurate. An object model database may include, for various real-world objects, coordinates that are meant to be meaningful within a coordinate system that is used by a global positioning system (GPS). When the user of an enhanced realty application uses his application at a particular place, the device on which that application executes may utilize its sensors—typically including a compass, a gyro, and a GPS—to estimate device attitude and displacement in reference to a given frame, and the GPS coordinates at which the device is positioned. The application may use this estimated location, attitude, and displacement information obtained automatically by the sensors in order to attempt to place the user accurately within a virtual model. If the user's position and orientation were estimated with perfect accuracy, and if the model to be portrayed were perfect, then the wire frame model of objects within the user's vicinity could be aligned perfectly accurately with the pixels that correspond to objects within the device's view. Under such circumstances, the enhanced information could be overlaid at precisely the correct positions within the enhanced reality view. Unfortunately, because GPS is a satellite-based technology, its positional estimates are not fine-grained, and often can only be obtained at a relatively coarse granularity, so that the user's actual coordinates within the wire frame model might be significantly offset from the coordinates estimated using the mobile device's GPS. Furthermore, inaccuracies in alignment between a wire frame model and the pixels within the device's view can result from errors in orientation, attitude, and displacement due to inaccuracies in compass, gyro, and tilt measurements. Consequently, even the best automatically ascertained coordinate and orientation estimates for the user can cause the enhanced reality application to align the wire frame model with the real world view imprecisely, producing errors in the manner in which enhanced information is overlaid in the enhanced view.

SUMMARY

In certain embodiments of the invention, a user interface enables a user to calibrate the position of a three dimensional model with a real-world environment represented by that model. Embodiments of the invention can take advantage of the fact that human vision excels at recognizing and associating (1) features from a simplified three-dimensional model of the environment with (2) live video of the environment. Embodiments of the invention can employ human vision in order to assist the precise registration between a projected model of the environment with live video of the environment. Techniques are disclosed for enabling a human to associate the features of the three-dimensional model with the live video. Using a device's suite of sensors, the device's location and orientation can be determined. A video image of the device's environment can be displayed on the device's display. The device can overlay a representation of an object from a virtual reality model on the video image. The position of the overlaid representation can be determined based on the device's location and orientation. In response to user input, the device can adjust a position of the overlaid representation relative to the video image.

In certain embodiments of the invention, a mobile device can overlay a three-dimensional grid of guidelines over a scene displayed on the mobile device. The mobile device can receive video input based on a gesture. The mobile device can interpret the video input in order to modify the grid with respect to the scene being displayed. In certain embodiments of the invention, the mobile device can receive audio input such as voice commands (e.g., "a little to the left," "a little up," etc.). The mobile device can interpret the audio input in order to modify the grid with respect to the scene being displayed.

In certain embodiments of the invention, an intuitive "reality grab" gesture can be combined with in-situ positioning mechanisms and databases of location-specific and orientation-specific "fingerprints" in order to establish a mobile device's exterior orientation. Such in-situ positioning mechanisms can include, for example, global positioning systems (GPS), cell towers, WiFi received signal strength indicator (RSSI) and time-of-flight, inertial mechanisms, accelerometry mechanisms, etc. Such location-specific and orientation-specific "fingerprints" can include, for example, compass anomalies, visual registration points, discernible directional sound, etc.

The following detailed description together with the accompanying drawings will provide a better understanding of the nature and advantages of the present invention.

BRIEF DESCRIPTION

DETAILED DESCRIPTION

Figure 1:
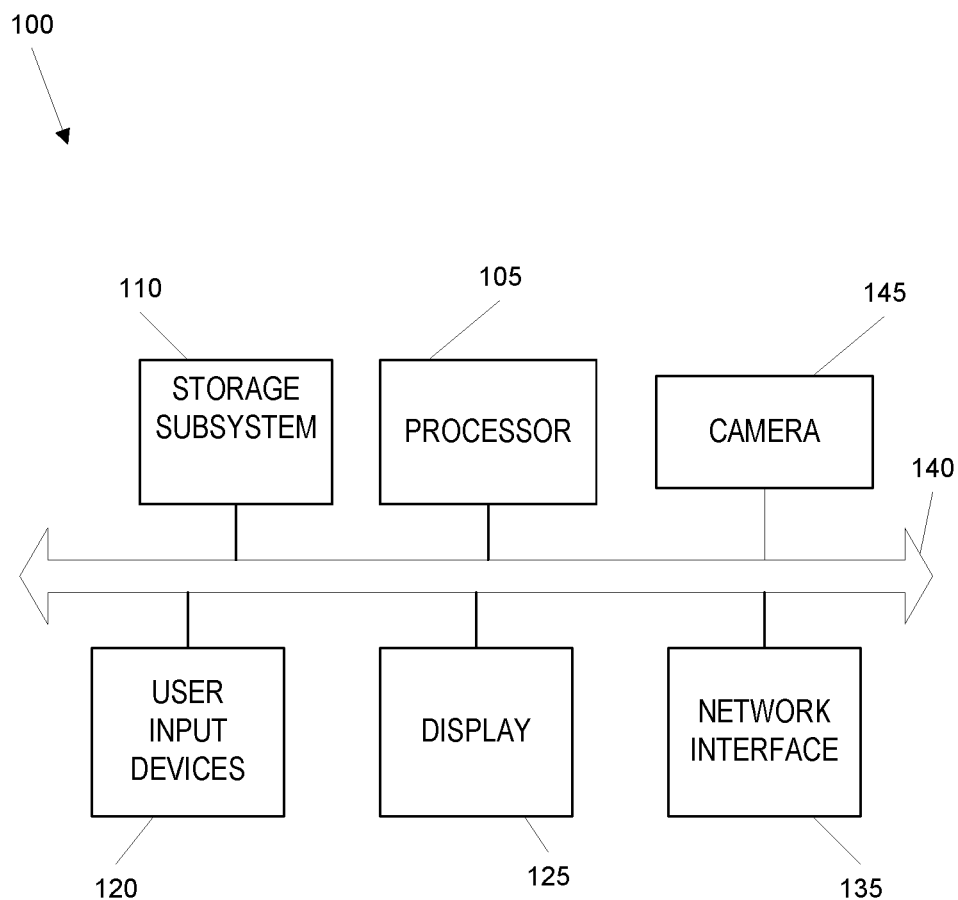
FIG. 1 is a block diagram of a computer system according to an embodiment of the present invention.

FIG. 1 illustrates a computer system 100 according to an embodiment of the present invention. Computer system 100 can be implemented as any of various computing devices, including, e.g., a desktop or laptop computer, tablet computer, smart phone, personal data assistant (PDA), or any other type of computing device, not limited to any particular form factor. Computer system 100 can include processing unit(s) 105, storage subsystem 110, input devices 120, display 125, network interface 135, a camera 145, and bus 140.

Processing unit(s) 105 can include a single processor, which can have one or more cores, or multiple processors. In some embodiments, processing unit(s) 105 can include a general-purpose primary processor as well as one or more special-purpose co-processors such as graphics processors, digital signal processors, or the like. In some embodiments, some or all processing units 105 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 105 can execute instructions stored in storage subsystem 110.

Storage subsystem 110 can include various memory units such as a system memory, a read-only memory (ROM), and a permanent storage device. The ROM can store static data and instructions that are needed by processing unit(s) 105 and other modules of electronic device 100. The permanent storage device can be a read-and-write memory device. This permanent storage device can be a non-volatile memory unit that stores instructions and data even when computer system 100 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that the processor needs at runtime.

Storage subsystem 110 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 110 can include removable storage media that can be readable and/or writeable; examples of such media include compact disc (CD), read-only digital versatile disc (e.g., DVD-ROM, dual-layer DVD-ROM), read-only and recordable Blu-Ray® disks, ultra density optical disks, flash memory cards (e.g., SD cards, mini-SD cards, micro-SD cards, etc.), magnetic "floppy" disks, and so on. The computer readable storage media do not include carrier waves and transitory electronic signals passing wirelessly or over wired connections.

In some embodiments, storage subsystem 110 can store one or more software programs to be executed by processing unit(s) 105. "Software" refers generally to sequences of instructions that, when executed by processing unit(s) 105 cause computer system 100 to perform various operations, thus defining one or more specific machine implementations that execute and perform the operations of the software programs. The instructions can be stored as firmware residing in read-only memory and/or applications stored in magnetic storage that can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 110, processing unit(s) 105 can retrieves program instructions to execute and data to process in order to execute various operations described herein.

A user interface can be provided by one or more user input devices 120, display device 125, and/or and one or more other user output devices (not shown). Input devices 120 can include any device via which a user can provide signals to computing system 100; computing system 100 can interpret the signals as indicative of particular user requests or information. In various embodiments, input devices 120 can include any or all of a keyboard, touch pad, touch screen, mouse or other pointing device, scroll wheel, click wheel, dial, button, switch, keypad, microphone, and so on.

Display 125 can display images generated by electronic device 100 and can include various image generation technologies, e.g., a cathode ray tube (CRT), liquid crystal display (LCD), light-emitting diode (LED) including organic light-emitting diodes (OLED), projection system, or the like, together with supporting electronics (e.g., digital-to-analog or analog-to-digital converters, signal processors, or the like). Some embodiments can include a device such as a touchscreen that function as both input and output device. In some embodiments, other user output devices can be provided in addition to or instead of display 125. Examples include indicator lights, speakers, tactile "display" devices, printers, and so on.

In some embodiments, the user interface can provide a graphical user interface, in which visible image elements in certain areas of display 125 are defined as active elements or control elements that the user can select using user input devices 120. For example, the user can manipulate a user input device to position an on-screen cursor or pointer over the control element, then click a button to indicate the selection. Alternatively, the user can touch the control element (e.g., with a finger or stylus) on a touchscreen device. In some embodiments, the user can speak one or more words associated with the control element (the word can be, e.g., a label on the element or a function associated with the element). In some embodiments, user gestures on a touch-sensitive device can be recognized and interpreted as input commands; these gestures can be but need not be associated with any particular array in display 125. Other user interfaces can also be implemented.

Network interface 135 can provide voice and/or data communication capability for electronic device 100. In some embodiments, network interface 135 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments, network interface 135 can provide wired network connectivity (e.g., Ethernet) in addition to or instead of a wireless interface. Network interface 135 can be implemented using a combination of hardware (e.g., antennas, modulators/demodulators, encoders/decoders, and other analog and/or digital signal processing circuits) and software components.

Bus 140 can include various system, peripheral, and chipset buses that communicatively connect the numerous internal devices of electronic device 100. For example, bus 140 can communicatively couple processing unit(s) 105 with storage subsystem 110. Bus 140 also connects to input devices 120 and display 125. Bus 140 also couples electronic device 100 to a network through network interface 135. In this manner, electronic device 100 can be a part of a network of multiple computer systems (e.g., a local area network (LAN), a wide area network (WAN), an Intranet, or a network of networks, such as the Internet. Bus 140 further enables communication between electronic device 100 and an accessory via accessory interface 155. Any or all components of electronic device 100 can be used in conjunction with the invention.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

It will be appreciated that computer system 100 is illustrative and that variations and modifications are possible. Computer system 100 can have other capabilities not specifically described here (e.g., mobile phone, global positioning system (GPS), power management, one or more cameras, various connection ports for connecting external devices or accessories, etc.). Further, while computer system 100 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Human Calibration of Virtual Models to Real World Views

Although computing devices become increasingly sophisticated by the day, a human being's visual capability to recognize objects within the real world around him remains vastly superior to that of any computing device. Certain embodiments of the invention seek to take advantage of a human being's superior visual recognition abilities in order to calibrate a virtual model of the human's local environment with a real-world view of that human's local environment.

Figure 2:
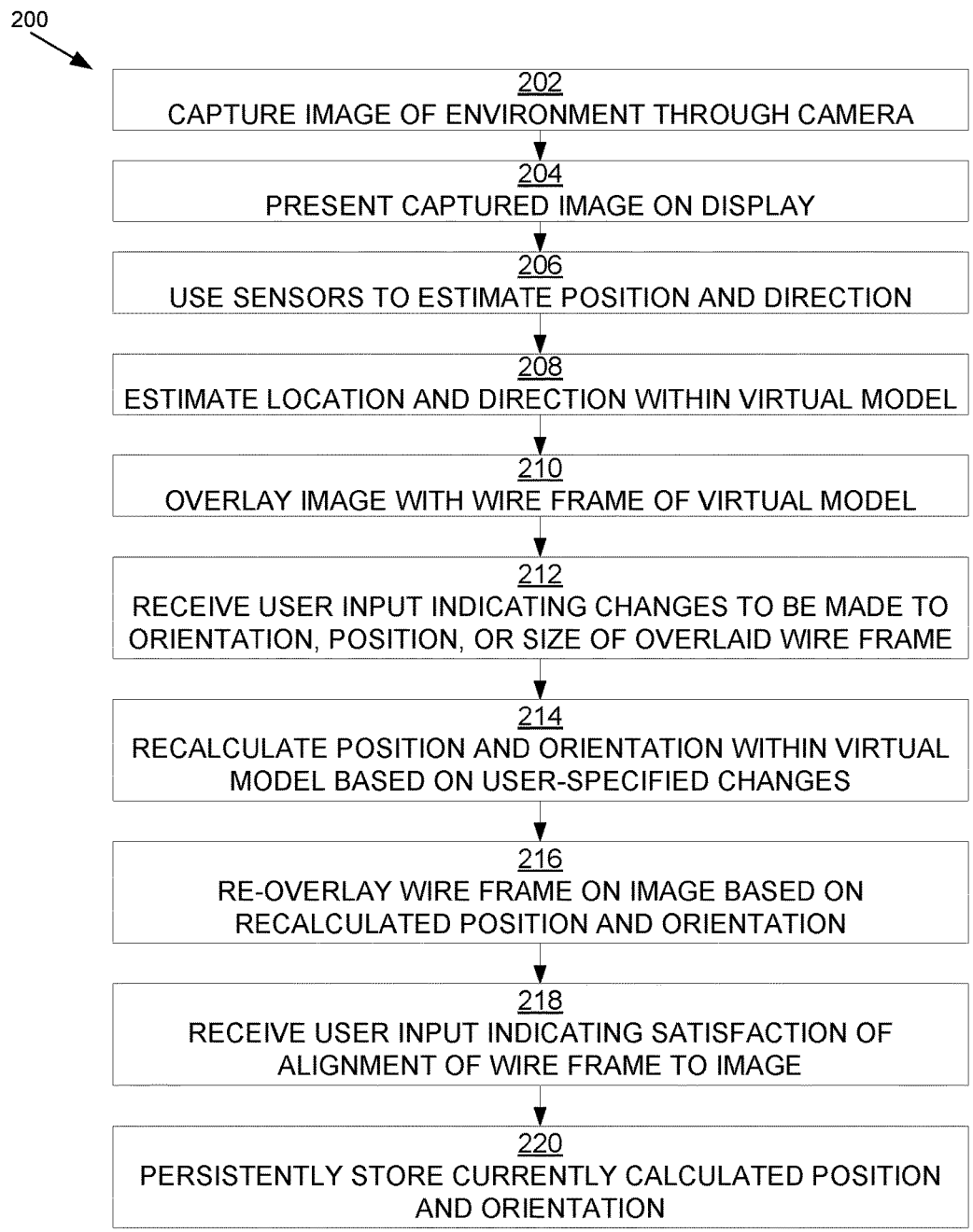
FIG. 2 is a flow diagram illustrating a technique for manually aligning a virtual model of an environment with a visual display of that environment, according to an embodiment of the invention.

FIG. 2 is a flow diagram illustrating a technique 200 for manually aligning a virtual model of an environment with a visual display of that environment, according to an embodiment of the invention. In block 202, a mobile device can capture an image of an environment through the device's camera. In block 204, the mobile device can present the captured image on the device's display. In block 206, the mobile device can use its internal sensors, such as a GPS, a gyro, and a compass, to estimate a current position, attitude, and displacement of the mobile device. The device can use its sensors to estimate the pitch, yaw, and roll of the device within three-dimensional space, thus estimating the device's camera's exterior orientation relative to six degrees of freedom. In block 208, the mobile device can use the estimated position and three-dimensional exterior camera orientation in order to estimate a location and direction of the mobile device within a virtual model of the environment. In block 210, based on the estimated location and three-dimensional exterior camera orientation of the mobile device within the virtual model, the mobile device can overlay the image of the environment with a portion of a virtual wire frame model of objects occurring within the environment. The virtual model information can be stored within the local memory of the mobile device. The virtual model information can be downloaded to the mobile device over one or more networks from one or more servers that are remote to the mobile device. Because the sensors have limited accuracy, the overlaid wire frame model is likely to be offset from where it should be placed within the image. The virtual model of the environment can include one or more streets and/or buildings, for example. In one embodiment, the virtual frame model includes one or more interior features of a building, such as a wall, a door, a window, a ceiling, a floor, furniture, appliances, wall-hangings, etc.

In block 212, the mobile device can receive user input that indicates changes that should be made to the orientation, position, and/or size of the portion of the wire frame model that is overlaid on the image. The user input can indicate changes to scaling or alignment through translation or rotation, for example. For example, the user input can take the form of physical gestures that the user makes relative to a touchscreen display on which the image is being presented.

Sliding a finger in a particular direction across the touchscreen display can instruct the device to move the wire frame model in that particular direction. Making a squeezing or expanding motion on the surface of the touchscreen display can instruct the device to shrink or increase the size of the wire frame model in accordance with that motion. Other gestures made relative to the surface of the touchscreen display can instruct the device to rotate the wire frame model around an axis centered on the device in a direction corresponding to the gesture. The extent to which the wire frame model is to be repositioned can be based on the extent of the gestures made; a very expansive gesture may instruct the device to make an extensive repositioning, while a relatively minor gesture may instruct the device to make merely small adjustments to the orientation of the wire frame model. Although in one embodiment of the invention the mobile device receives user input in the form of gestures made relative to a touchscreen display, in an alternative embodiment of the invention, other forms of user input can similarly instruct the mobile device to make such realignments. For example, in one embodiment of the invention, the mobile device's display can overlay the image of the real-world environment with user interface controls which, when activated by the user, instruct the mobile device to perform realignments of the kinds described above.

In block 214, the mobile device can recalculate the position and orientation of the mobile device within the virtual model based on the changes indicated by the user input received in block 212. For example, the mobile device can determine that the user is actually two feet to the left of the position that was estimated by the mobile device's GPS, and the mobile device can determine that the user is actually facing a half a degree further clockwise along some axis in three-dimensional space than the exterior camera orientation that was estimated by the mobile device's compass.

In block 216, the mobile device can re-overlay the image of the real-world environment with a revised portion of the wire frame model based on the position and orientation recalculated in block 214. In certain embodiments of the invention, this process can be repeated until the mobile device's user is satisfied, based on his visual perception, that the wire frame model overlaid on the image shown on the display is sufficiently aligned with the real-world objects represented within that image.

In block 218, the mobile device can receive user input that indicates that the user is satisfied with the new alignment of the wire frame model to the real-world objects represented with the image. For example, the user input can indicate that the user wishes to "lock-in" the currently calculated position and orientation coordinate information. In block 220, in response to receiving such input, the mobile device can cause the currently calculated position and orientation coordinate information to be stored persistently within the local memory of the mobile device. In one embodiment of the invention, in response to receiving such input, the mobile device can modify some or all of the three dimensional coordinates specified by the virtual model to reflect the corrections made by the user. Thereafter, the mobile device can continue to use the human-corrected position and orientation information to align the virtual model with objects in the real-world environment. Thus, if the mobile device's user moves or turns, thereby causing the mobile device to move or turn, then the device's sensors (e.g., a gyroscope) can detect this movement and automatically recalculate the user's new position and orientation relative to the human-corrected position and orientation information. Based on the alignment between the virtual model and the real-world environment, the mobile device can overlay images of real-world objects shown on the mobile device's display with information pertaining to and mapped to those objects (e.g., names, prices, menus, addresses, phone numbers, ages, weights, histories, etc.), so that the overlaid information is correctly placed in the image relative to the objects to which the overlaid information pertains.

In one embodiment, after the virtual model has been aligned with the pixels in the real-world image, the mobile device user can use the mobile device's touchscreen interface to interact with the image and modify the image. For example, the user might interact with the image in the manner that causes a wall of a building to vanish or "peel away" so that the user can then view the wire frame structure of the building's interior. Under such circumstances, the pixels corresponding to the removed surface may be replaced, on the display, with filled-in pixels representing the building's interior, including floors, doors, windows, etc. Essentially, in one embodiment, once the virtual model has been properly aligned with the real-world image, the mobile device's user can exercise a form of "x-ray vision" relative to the world shown on his mobile device's display.

Visually Detected Alignment Gestures

As is discussed above, in one embodiment of the invention, a mobile device user can perform gestures relative to a touchscreen display of his mobile device in order to align a wire frame, representing a portion of a virtual model, with objects represented within an image captured by his mobile device's camera. In an alternative embodiment of the invention, the mobile device's camera can capture images of the user's hand within the environment. For example, using one hand, the user may hold his mobile device in a manner that causes an image of a portion of his real-world environment to be captured and presented on his mobile device's display. The user can hold his other hand out into the field of vision of the mobile device's camera so that the image of that hand is captured along with the remainder of the portion of the real-world environment. In such an embodiment, the mobile device can use recognition algorithms to determine automatically that a hand in represented within the image. The mobile device can use such recognition algorithms in order to detect a particular configuration of fingers that represents a gesture that the user is making with his hand in the image. The mobile device can analyze several different images, representing a same scene over a period of time, in order to detect, automatically, a gesture that the user is making with his hand. The mobile device can then match this gesture against a database of known gestures in order to locate an alignment action that is mapped, in the database, to that gesture.

Within the database, different gestures can be mapped to different alignment actions. In one embodiment, a grasping gesture indicates to the mobile device that the user desires to re-align the wire frame currently being shown on the display. In response to detecting such a grasping gesture, the mobile device can look for further future gestures that indicate the types of realignments that are to be performed. Conversely, in one embodiment, a releasing gesture indicates to the mobile device that the user is finished re-aligning the wire frame currently being shown on the display. In response to detecting such a releasing gesture, the mobile device can "lock-in" the re-alignments that the user has made since the previous making of the grasping gesture.

While the user makes gestures by moving his hand within the camera's field of vision, the mobile device can move the wire frame around the display in a direction along some axis within three-dimensional space that is consistent with the movement of the user's hand. For example, in response to detecting the user's grasped hand moving in a particular direction after initially detecting the grasping gesture, the mobile device can re-align the wire frame within the presented image toward that particular direction. In one embodiment of the invention, the mobile device can move the wire frame in solidarity with the user's grasped hand against the real-world environment shown on the display, so that as long as the user's hand remains grasped, the wire frame moves as though it were being held in the user's hand. Thus, the extent to which the wire frame moves against the real-world environment can correspond to the extent to which the user moves his grasped hand within the real-world environment. Other gestures, such as a twisting motion made with the grasped hand about some axis in three-dimensional space, can cause the mobile device to rotate the wire frame against the real-world environment in the direction of the grasped hand's rotation about the axis and to the extent of the grasped hand's rotation. A pulling or pushing motion made by a grasped hand within the camera's field of vision can cause the mobile device to move the wire frame toward or away from the user's position to an extent that corresponds to the extremity of the pulling or pushing motion. In one embodiment of the invention, movements made by an ungrasped hand within the camera's field of vision do not cause the mobile device to re-align the wire frame. In one embodiment of the invention, a pinching motion made with two fingers of a hand within the camera's field of vision has an effect similar to that described above relative to a grasping hand. In one embodiment of the invention, certain gestures correspond to various different affine transformations, which can adjust the orientation of the visual model within a user-specified plane.

Audibly Detected Alignment Commands

In an alternative embodiment of the invention, an intelligent software agent, capable of performing voice recognition, can execute on the mobile device. In such an embodiment, the intelligent software agent can detect audible vocal commands received through the mobile device's microphone. For example, the intelligent software agent might detect such commands as "move left," "move right," "move up," "move down," "move forward," or "move backward." In response to receiving such a vocal command, the intelligent software agent can match the command against a database of vocal commands that are mapped to different calibration actions. In response to determining that a received vocal command matches a particular calibration action (e.g., moving the visual model left or right relative to the real-world environment being displayed), the intelligent software agent can cause the mobile device to manipulate the visual model and its corresponding wire frame according to the particular calibration action.

Aggregating Multiple Calibrations

In one embodiment of the invention, the process discussed above whereby a user aligns a virtual model of an environment with a real-world display of that environment affects only the version of the virtual model that is persistently stored within the local memory of that user's mobile device. However, in an alternative embodiment of the invention, after a mobile device user "locks in" the calibrations made using the techniques discussed above, the mobile device uploads those calibrations over one or more wireless networks to a central repository in which a definitive edition of the virtual model is stored. Over time, many different calibrations from many different mobile devices can be uploaded to the central repository. In one embodiment, these many different calibrations can be compared to each other to determine which calibrations tend to agree with each other. Calibrations that are very close to most other calibrations are more likely to be correct, since it is unlikely that many different users would have made incorrect calibrations. Calibrations that are significantly unlike most other calibrations are likely to be incorrect, and can be discarded after a sufficient quantity of comparisons have been made. After a set of calibrations that is most likely accurate has been collected from multiple different mobile devices over a period of time, the central repository can aggregate those calibrations in order to adjust the three dimensional coordinates of the definitive edition of the virtual model. For example, the central repository can average the calibrations and then modify the coordinates of the definitive edition of the virtual model based on the averaged calibrations. After adjusting the definitive edition of the virtual model in this manner, the central repository can push the adjusted definitive edition to all mobile devices of which the central repository is aware, e.g., through a software update. Additionally or alternatively, thereafter, whenever a new mobile device requests a download of the definitive edition of the virtual model for the first time, the central repository may transmit, to that mobile device, the definitive edition that has been adjusted using the aggregated calibrations of many different mobile devices.

Marker-Based Alignment

Certain embodiments of the invention discussed above involve a mobile device calibrating a virtual model of an environment with a real-world visual display of that environment based on human interactions with the device. In an alternative embodiment of the invention, a mobile device can automatically calibrate such a virtual model to such a real-world visual display automatically, without any human interaction, based on visual markers automatically recognized within the real-world image. In one embodiment, unique markers are deliberately placed within a real-world environment. The markers are unique in the sense that they are not found elsewhere by chance in the environment, and therefore serve as positive identifications of locations in the environment. The existence of these unique markers in the real-world environment is known to the generator of the virtual model. The places where these unique markers occur is encoded into the virtual model. For example, the three dimensional coordinates of each such marker may be specified within the virtual model. In one embodiment of the invention, the mobile device can be configured to detect these markers whenever they come into the view of the mobile device's camera during execution of the enhanced reality application. In response to detecting that such a marker is present within the real-world image being presented on the mobile device's display, the mobile device can automatically calibrate the wire frame corresponding to the virtual model with the real-world image by aligning the position of the unique marker in the virtual model with the position of the pixels of the corresponding unique marker within the real-world image. By shifting the position of the virtual model in this manner, the entire virtual model can be calibrated. Indeed, in one embodiment of the invention, the mobile device can visually determine its location within the real-world environment without the aid of GPS by visually locating, in a captured image, a unique physical feature, such as a unique painting on a wall or an outline of a unique building, whose coordinates within the virtual model are known. The mobile device can then visually estimate its distance from and orientation relative to the unique physical feature's known coordinates.

Although in one embodiment the markers are deliberately designed and placed within the real-world environment so as to be easily detectable (e.g., by having a distinctive visual appearance), in an alternative embodiment, the real-world markers used to align the virtual model in the manner discussed above are not deliberately designed, but, instead, can be physical features that would regularly occur in the real-world environment even in the absence of the virtual model. For example, these physical features can be regularly occurring components that are known by the designer of the virtual model only to occur at certain locations in the real-world environment. Thus, for example, the markers can be physical features such as light fixtures that have a certain shape that no other light fixture in the real-world environment has. The markers can be patterns of tile that occur in a specific place on a floor and nowhere else, for example. Combinations of non-unique physical features, arranged in a pattern that only occurs in known places in the real-world environment, also can serve as markers, even though the individual features might be commonplace in the environment (so long as the pattern that they form is not commonplace). The markers described above can be stored within a shared database of markers stored on a remote server. Using techniques described below, mobile devices within an environment can cooperate to build up the marker data such a database of markers so that other yet mobile devices can benefit from the information stored therein.

Mobile devices can sense characteristics of an environment at least in part by using built-in global positioning systems of those mobile devices. However, sometimes in indoor venues such as buildings, global positioning systems are less effective at sensing environmental characteristics because the walls and ceilings of the venues can obstruct the reception of satellite signals upon which the global positioning systems rely. Furthermore, global positioning systems sometimes can give only a coarse indication of a geographical location, and imprecision can be undesirable when location within a more confined space such as a building is called for.

Therefore, in an embodiment of the invention, a mobile device can estimate its location using one or more of, or a combination of several of, the following: cellular telephone signals, WiFi network signals, Bluetooth signals, other radio frequency signals, etc. Software executing on a mobile device can be configured with information indicating a source and location of each of these signals relative to a venue. By determining the relative strength of each such signal and using information indicating the location of the source of each such signal, the mobile device can automatically estimate its current location within the venue even without the use of a global positioning system. For example, if a first signal from a first source is relatively weak, but if a second signal from a second source is relatively strong (relative to the first signal), then the mobile device can estimate that it is closer to the location of the second source than it is to the location of the first source. In one embodiment of the invention, the mobile device can use a compass and accelerometer to determine, over time, a direction and speed at which its user is moving within a venue. As the mobile device moves through the venue, the mobile device can measure the strengths of various signals over time. Based on these measurements, the mobile device can determine that as it moves in a particular direction at a particular speed, some of the signals from some of the sources may become stronger at certain rates, while others of the signals from others of the sources may become weaker at certain rates. Based at least in part on the direction and speed of the mobile device's movement, the measured differing strengths of signals from various sources over a time interval, and the known geographical locations of the sources of those signals, the mobile device can automatically determine its approximate distance from each of those sources over the time interval. Thus, the mobile device can automatically determine its position and/or orientation within the venue, and can transmit this positional and orientation information wirelessly to a remote server, which can build up a database of such positional and orientation information from multiple mobile devices.

In one embodiment of the invention, samples of the radio frequency (RF) environment are taken at various geographical points within a venue. Given that a sensory device can encounter different strengths of different RF signals at each point, a different RF "fingerprint" can be ascertained and recorded by the sensory device at each point in the sampling. A user of the sensory device can store a mapping between his known geographical coordinates (which can be determined using any approach) and the RF fingerprint sensed by the sensory device at those coordinates. Thus, a database of mappings between geographical coordinates/orientations and corresponding RF fingerprints for a particular venue can be constructed. Later, when other mobile devices are present within the particular venue, those mobile devices can use their sensors to detect the distinct RF fingerprints at their current locations. Then, by consulting the database pertaining to its current venue, a mobile device can estimate its current coordinates and orientation by locating the currently sensed RF fingerprint and determining the geographical coordinates and orientation that are mapped to that RF fingerprint; those geographical coordinates and orientation are the mobile device's current geographical coordinates and orientation. The mobile device can then transmit these geographical coordinates and orientation wirelessly to a remote server. Alternatively, if the RF fingerprint database is stored at the remote server, then the mobile device can transmit its currently sensed RF fingerprint to the remote server, and the remote server can then automatically determine the mobile device's current coordinates and orientation based at least in part on that RF fingerprint. Alternatively, instead of measuring an RF fingerprint, a device can measure a fingerprint that is based on any kind of unique distortion in a signal detectable by any sensor or combination of sensors of the device. For example, in an embodiment, a device can measure a fingerprint based on compass distortions detected by the device's sensors.

In one embodiment of the invention, multiple mobile device users can use the cameras of their mobile devices to take digital photographs at various locations and at various orientations within a venue or environment. The mobile devices can automatically tag these digital photographs with metadata indicative of the locations and orientations at which the digital photographs were taken. The mobile devices can automatically (or in response to a user's input) upload these digital photographs, with the associated metadata, to a remote server, which can build up a database of digital photographs and associated metadata. Each such digital photograph can serve as a visual marker to other mobile devices that access the information stored in the database. For example, by comparing its current camera view to a database of digital images, a mobile device can automatically match its current camera view to a digital image based on visual similarities, and then use the location and orientation metadata mapped to that matching digital image in the database as an estimate of that mobile device's current location and orientation. This estimated location and orientation can then be used to align a wire frame model of an environment with the currently viewed digital portrayal of that environment by the mobile device's camera. In one embodiment of the invention, to preserve the privacy of various mobile device users that upload digital photographs to a remote server in the manner described above, the mobile device can first remove, from the metadata associated with each digital photograph, specific metadata that could potentially be used to identify the user. In one embodiment of the invention, the kinds of private information (e.g., name, address, telephone number, IP address, etc.) that a mobile device will automatically remove from a digital image's metadata prior to uploading that digital image to the remote server can be defined in the mobile device's configuration settings by the mobile device's user.

Figure 3:
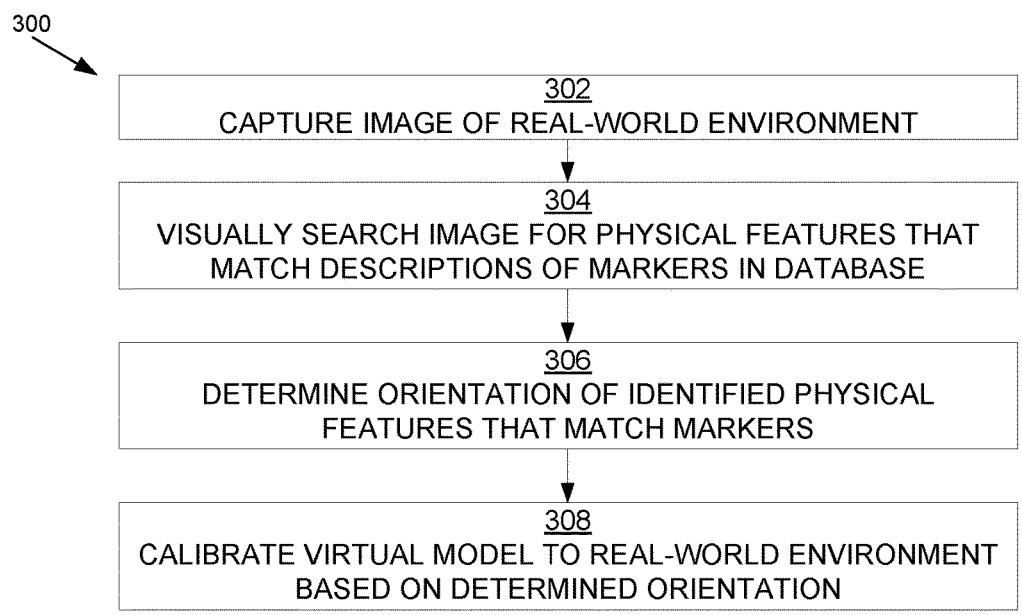
FIG. 3 is a flow diagram illustrating a technique for automatically aligning a virtual model of an environment with a visual display of that environment based on physical features automatically detected within the visual display, according to an embodiment of the invention.

FIG. 3 is a flow diagram illustrating a technique 300 for automatically aligning a virtual model of an environment with a visual display of that environment based on physical features automatically detected within the visual display, according to an embodiment of the invention. In block 302, the mobile device can use its camera to capture an image of a portion of the real-world environment as a part of the execution of an enhanced reality application. In block 304, the mobile device can visually search the captured image for physical features or patterns of physical features that match descriptions of markers in a stored database of known markers. In block 306, in response to locating, within the image, a physical feature or pattern of physical features that match known markers, the mobile device can determine an orientation of the physical feature or pattern of physical features. For example, the mobile device can determine the orientation based on the visible angle and perspective with which the physical feature or pattern of physical features occurs within the image. Computer vision algorithms, such as, for example, RANSAC homography can be used to perform image-based registration and point-of-interest extraction. RANSAC homography can be used to determine the relative homography between different image pairs. These computer vision algorithms can be used to extract relative and absolute orientation (i.e., attitude, pointing) from the camera. RANSAC homography can use robust image feature key-point detector descriptors such as SIFT, SURF, ORB, FREAK, FAST, etc. These correspond to underlying algorithms that can be used to detect and described key-point features. In block 308, based on both the automatically determined orientation of the features and the coordinates that are mapped, in the database, to the markers that the features match, the mobile device can calibrate the virtual model to the real-world environment by shifting and/or rotating the virtual model's coordinates such that the coordinates of the matching marker are precisely aligned with the features in the real-world environment. Although an embodiment of the invention is described in which visual markers in an environment are used to calibrate a virtual model with a real-world environment, in alternative embodiments of the invention, any kinds of markers or "fingerprints" that can be sensed by any sensors of the device—visual or not—can be used for this purpose. For example, RF "fingerprints" can be used to perform such calibration.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded and stored on various computer readable storage media; suitable media include magnetic disk or tape, optical storage media such as compact disk (CD) or DVD (digital versatile disk), flash memory, and other non-transitory media. Computer readable media encoded with the program code can be packaged with a compatible electronic device, or the program code can be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
    capturing, by a camera of a mobile device, an image of an environment;
    detecting a particular pattern within the image of the environment captured by the camera;
    locating the particular pattern in a database of patterns;
    determining a set of coordinates that are mapped to the particular pattern in the database;
    based at least in part of the set of coordinates, automatically determining a location of the mobile device within the environment;
    based on the determined location of the mobile device within the environment, aligning a wire frame model of a virtual model of the environment over an image of the environment presented on a display of the mobile device in order to obtain calibration information;
    receiving a user lock-in input; and
    in response to receiving the lock-in input, sending, by the mobile device, the calibration information to a central repository configured to store a most recently updated calibration information,
    wherein the central repository is configured to receive and store a plurality of calibration information over a period of time and aggregates the plurality of calibration information to create an updated virtual model.

2. The method of claim 1, further comprising:
    determining initial coordinates for a virtual model of the environment based on a global positioning system of the mobile device; and
    automatically adjusting coordinates of the virtual model based on differences between a position of a marker specified within the virtual model and a position of the pattern relative to the mobile device.

3. The method of claim 1, wherein the pattern comprises a configuration of one or more components of a first type, wherein other components of the first type occur within the environment outside of the pattern, and wherein the pattern of the components occurs uniquely within the environment.

4. The method of claim 1, further comprising:
moving the wire frame model of the environment in response to gestures made by a user of the mobile device.

5. The method of claim 1, wherein the wire frame model represents objects in the virtual model.

6. The method of claim 1, further comprising displaying the wire frame model on a display; and
in response to input gestures made on the display, modifying a position of the wire frame model.

7. The method of claim 1, further comprising:
receiving one or more vocal commands through a microphone of the mobile device; and
in response to the one or more vocal commands, automatically adjusting a position of the wire frame model relative to the image in a manner that corresponds to the one or more vocal commands.

8. A non-transitory computer readable-medium storing one or more instructions, which, when executed by one or more processors, cause the one or more processors to perform:
capturing, by a camera of a mobile device, an image of an environment;
detecting a particular pattern within the image of the environment captured by the camera;
locating the particular pattern in a database of patterns;
determining a set of coordinates that are mapped to the particular pattern in the database;
based at least in part of the set of coordinates, automatically determining a location of the mobile device within the environment;
based on the determined location of the mobile device within the environment, aligning a wire frame model of the environment over an image of the environment presented on a display of the mobile device in order to obtain calibration information, wherein the wire frame model is a virtual model of the environment;
receiving a user lock-in input; and
in response to receiving the lock-in input, sending, by the mobile device, the calibration information to a central repository configured to store a most recently updated calibration information,
wherein the central repository is configured to receive and store a plurality of calibration information over a period of time and aggregates the plurality of calibration information to create an updated virtual model.

9. The non-transitory computer readable-medium of claim 8, further comprising:
determining initial coordinates for a virtual model of the environment based on a global positioning system of the mobile device; and
automatically adjusting coordinates of the virtual model based on differences between a position of a marker specified within the virtual model and a position of the pattern relative to the mobile device.

10. The non-transitory computer readable-medium of claim 8, wherein the pattern comprises a configuration of one or more components of a first type, wherein other components of the first type occur within the environment outside of the pattern, and wherein the pattern of the components occurs uniquely within the environment.

11. The non-transitory computer readable-medium of claim 8, further comprising:
moving the wire frame model of the environment in response to gestures made by a user of the mobile device.

12. The non-transitory computer readable-medium of claim 8, wherein the wire frame model represents objects in the virtual model.

13. The non-transitory computer readable-medium of claim 8, further comprising displaying the wire frame model on a display; and
in response to input gestures made on the display, modifying a position of the wire frame model.

14. The non-transitory computer readable-medium of claim 8, further comprising:
receiving one or more vocal commands through a microphone of the mobile device; and
in response to the one or more vocal commands, automatically adjusting a position of the wire frame model relative to the image in a manner that corresponds to the one or more vocal commands.

15. A mobile device comprising:
one or more sensors; and
one or more processors configured to:
capture, by a camera of the mobile device, an image of an environment;
detect a particular pattern within the environment captured by the camera;
locate the particular pattern in a database of patterns;
determine a set of coordinates that are mapped to the particular pattern in the database;
based at least in part of the set of coordinates, automatically determine a location of the mobile device within the environment;
based on the determined location of the mobile device within the environment, align a wire frame model of a virtual model of the environment over an image of the environment presented on a display of the mobile device in order to obtain calibration information;
receiving a user lock-in input; and
in response to receiving the lock-in input, sending, by the mobile device, the calibration information to a central repository configured to store a most recently updated calibration information,
wherein the central repository is configured to receive and store a plurality of calibration information over a period of time and aggregates the plurality of calibration information to create an updated virtual model.

16. The device of claim 15, further comprising:
determining initial coordinates for a virtual model of the environment based on a global positioning system of the mobile device; and
automatically adjusting coordinates of the virtual model based on differences between a position of a marker specified within the virtual model and a position of the pattern relative to the mobile device.

17. The device of claim 15, wherein the pattern comprises a configuration of one or more components of a first type, wherein other components of the first type occur within the environment outside of the pattern, and wherein the pattern of the components occurs uniquely within the environment.

18. The device of claim 15, further comprising:
moving the wire frame model of the environment in response to gestures made by a user of the mobile device.

19. The device of claim 15, wherein the wire frame model represents objects in the virtual model.

20. The device of claim 15, further comprising displaying the wire frame model on a display; and
in response to input gestures made on the display, modifying a position of the wire frame model.

* * * * *